United States Patent [19]

Leitnaker

[11] 4,265,983
[45] May 5, 1981

[54] DELTA FERRITE-CONTAINING AUSTENITIC STAINLESS STEEL RESISTANT TO THE FORMATION OF UNDESIRABLE PHASES UPON AGING

[75] Inventor: James M. Leitnaker, Kingston, Tenn.

[73] Assignee: The United States of America as represented by the United States Department of Energy, Washington, D.C.

[21] Appl. No.: 52,180

[22] Filed: Jun. 26, 1979

[51] Int. Cl.³ .......................................... B32B 15/18
[52] U.S. Cl. ........................... 428/683; 219/137 WM
[58] Field of Search ................ 428/683; 219/137 WM

[56] References Cited

U.S. PATENT DOCUMENTS 3,716,691  2/1973  Baybrook et al. .......... 219/137 WM
4,119,765  10/1978  Pinnow et al. ...................... 428/683

*Primary Examiner*—Melvyn J. Andrews
*Attorney, Agent, or Firm*—Allen H. Uzzell; Stephen D. Hamel; James E. Denny

[57] ABSTRACT

Austenitic stainless steel alloys containing delta ferrite, such as are used as weld deposits, are protected against the transformation of delta ferrite to sigma phase during aging by the presence of carbon plus nitrogen in a weight percent 0.015–0.030 times the volume percent ferrite present in the alloy. The formation of chi phase upon aging is controlled by controlling the Mo content.

4 Claims, 1 Drawing Figure

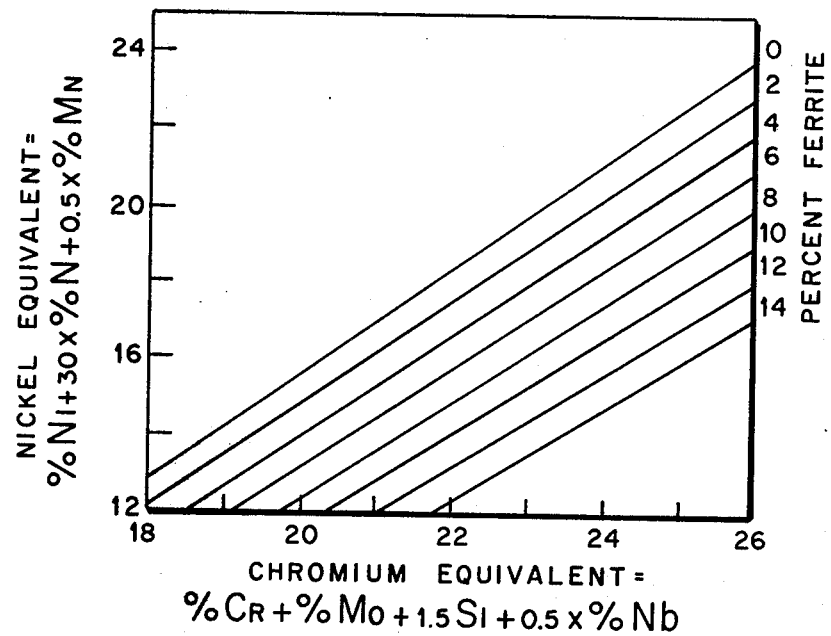

DELTA FERRITE-CONTAINING AUSTENITIC STAINLESS STEEL RESISTANT TO THE FORMATION OF UNDESIRABLE PHASES UPON AGING

This invention is a result of a contract with the United States Department of Energy.

BACKGROUND OF THE INVENTION

1. Field of the Invention

This invention relates to the suppression of undesirable phases in austenitic stainless steels. More particularly this invention relates to the suppression of chi and sigma phases in austenitic stainless steels containing a quantity of delta ferrite phase. As used herein, the terms "ferrite" and "delta ferrite" are synonymous. Steels containing delta ferrite are widely used as weld deposits for joining austenitic stainless steel components.

2. Description of the Prior Art

It has been known for many years that the crack sensitivity of austenitic stainless steel weld deposits could be reduced by the presence of delta ferrite in the deposit. It was recognized, however, that delta ferrite was undesirable in the weld deposit when the temperature and time cycles encountered during manufacturing or service permitted the transformation of delta ferrite to embrittling sigma phase. Consequently, for many high-temperature applications a maximum ferrite limit is imposed. For example, a 4-8% ferrite limit is imposed in weld deposits used for joining type 316 stainless steel in nuclear reactor components.

In the welding art it is customary to estimate the amount of ferrite present in a weld deposit based upon the composition of the filler metal, e.g., the consummable electrode in metal arc welding, and then to determine the amount of ferrite actually produced by measuring the magnetic properties of the weld. This ferrite estimate, sometimes called the ferrite number, is normally based upon the well-known Schaeffler constitution diagram (or a modification thereof) which correlates the amount of ferrite with the equivalent amounts of chrome and nickel in the alloy. Measurements of the ferrite content of the weld deposit are customarily made with an apparatus known as a Magna-Gage. The use of Schaeffler-type diagrams and Magna-Gages is more fully described by DeLong et al. in "Measurement and Calculation of Ferrite in Stainless Steel Weld Metal," *Welding Research*, Vol. 35, pp. 521s–528s (Nov. 1956), which is incorporated herein by reference.

It has been concluded by some workers in the prior art that chi phase as well as sigma phase participates in the embrittlement of austenitic stainless steels; see, for example Hull, F. C., "Effects of Composition on Embrittlement of Austenitic Stainless Steels," *Welding Journal Research Supplement*, Vol. 52, pp. 104–113 (March 1973). Hull pointed out that some alloys appear to be essentially immune to sigma and chi precipitation. It was observed that the tendency for embrittlement to occur upon aging generally increases as chromium is increased to improve oxidation or corrosion resistance; as molybdenum is increased to decrease pitting attack; as molybdenum, tungsten, or vanadium are added to increase strength; as titanium, columbium (niobium), or tantalum are added to stabilize carbon; or, as nickel is decreased to reduce cost or to provide delta ferrite.

Though much work has been done in an effort to explain sigma phase formation, it is still not fully understood. For example, Weiss, B. et al. in "*Phase Instabilities During High-Temperature Exposure of 316 Austenitic Stainless Steel,*" *Metalurgical Transactions*, Vol. 3, pp. 851–866 (April, 1972), suggest that carbide precipitation causes the formation of sigma phase by reducing the carbon content in the matrix metal.

Stiegler, J. O. et al. in "Effect of Residual Elements on Fracture Characteristics and Creep Ductility of Type 308 Stainless Steel Weld Metal," *Journal of Engineering Materials and Technology*, pp. 245–250 (July 1975), suggest that control of the residual amounts of boron, phosphorus and titanium increases the ductility of the weld deposit due to the prevention of internal crack formation at austenite/sigma interfaces, possibly retarding the formation of sigma phase. Precipitation of carbon and other interstitials from austenitic stainless steels was said to soften the welds and permits more deformation before failure occurs. Carbon, phosphorus, boron, and sulfur added singly produced stronger weld metal than conventional welds. Boron and phosphorus additions produced welds with increased creep ductility as well. Sigma phase formed in all of the reported weld deposits.

STATEMENT OF THE OBJECTS

It is an object of this invention to provide a composite structure comprising at least two structural portions of austenitic stainless steel alloys joined to one another by an austenitic stainless steel weldment resistant to the formation of sigma phase. It is a further object of this invention to provide such a composite structure comprising an austenitic stainless steel weldment resistant to the formation of chi phase. It is a further object to provide a method for suppressing the transformation of ferrite phase present in austenitic stainless steel alloys to sigma phase upon exposure to elevated temperature. It is a further object to provide a method for suppressing the formation of chi phase in austenitic stainless steel alloys upon exposure to elevated temperature.

Other objects, advantages, and novel features of the invention will become apparent to those skilled in the art upon examination of the description of the invention which follows.

SUMMARY OF THE INVENTION

This invention comprises a composite structure having at least two structural portions of austenitic stainless steel joined to one another by an austenitic stainless steel weldment containing a quantity of ferrite phase, said weldment containing carbon plus nitrogen in a weight percent of 0.015–0.030 times the volume percent of ferrite in said weldment, said carbon plus nitrogen present in an amount sufficient to substantially prevent the transformation of ferrite phase to sigma phase on exposure to elevated temperatures. This invention also comprises the above composite structure in which the weldment comprises by weight 8.5–9.5% Ni, 14.0–16.4% Cr, up to 1.2% Mo and the balance predominantly iron, the Mo content of the weldment being insufficient to result in the formation of chi phase within the weldment upon exposure to elevated temperatures. In a method aspect this invention is a method for suppressing the transformation of ferrite phase present in austenitic stainless steel alloys to sigma phase upon exposure to elevated temperature comprising including within said alloy a weight percent of carbon plus nitrogen 0.015 to 0.030 times the volume percent of said ferrite phase within said alloy.

In another method aspect, this invention is an improvement in an arc welding method in which an austenitic stainless steel is caused to melt and deposit as a weld deposit containing a quantity of ferrite, the improvement wherein said weld deposit contains carbon plus nitrogen in a weight percent of 0.015-0.030 times the volume percent of said ferrite, said carbon plus nitrogen present in an amount sufficient to substantially prevent the transformation of ferrite phase to sigma phase upon exposure of the weld deposit to elevated temperatures.

BRIEF DESCRIPTION OF THE DRAWING

The FIGURE is a constitution diagram for austenitic stainless steel showing the percent ferrite to be expected as a function of nickel equivalent and chromium equivalent. The percent ferrite lines can be linearly extrapolated beyond the composition limits of the FIGURE.

DETAILED DESCRIPTION OF THE INVENTION

The ferrite, chi and sigma phases in steels are well characterized in the art. Chi phase is identified as a body centered cubic phase having a lattice parameter of about 8.9 Å, and having a varying composition. Chi phase does not occur in the binary Fe-Cr, Fe-Mo, or Cr-Mo system, but it does appear in the Fe-Mo-Cr system. The lattice parameter varies with the composition. Sigma phase is identified as a tetragonal close-paced structure with lattice parameters of a=8.8 Å, and c=4.5 Å. Sigma phase occurs in the Fe-Cr system and is stabilized by Mo and Si. Ferrite phase (delta ferrite) is identified as a body-centered cubic phase with a lattice constant of about 2.03 Å.

It has been discovered according to this invention that the transformation of ferrite to sigma phase in austenitic stainless steels can be prevented when sufficient carbon plus nitrogen is present to cause the ferrite phase to have a chromium content no greater than about 16% by weight. The relationship of Cr equivalent to sigma phase formation is described in Leitnaker et al, "Precipitate Phases in Type 321 Stainless Steel After Aging 17 Years at ~600° C.," *Metallurgical Transactions A*, Vol. 8A, October 1977, pp. 1605–1613. I have found according to this invention that metal carbides, $M_{23}C_6$ (actually $M_{23}(C,N)_6$), when present at the ferrite/austenite interface, cause the reduction of the chromium content of the ferrite. Consequently, by including sufficient carbon, or carbon plus nitrogen in the weld deposit, the chromium content of the ferrite is reduced to a level generally less than (16% by weight) at which the ferrite to sigma transformation does not occur. The carbon plus nitrogen is present in a combined state and can be substantially all carbon.

The amount of carbon plus nitrogen needed to prevent sigma phase composition will depend upon the percent of ferrite present in the weld and upon the chromium composition of the ferrite which occurs in the absence of carbon and nitrogen. Such ferrite generally contains 22–27% by weight Cr, and usually about 25%. The precipitate which forms at the austenite/ferrite boundary has the approximate composition $Cr_{16}Fe_5Mo_2(C,N)_6$. The amount of carbon plus nitrogen required in the alloy to prevent sigma phase formation can be calculated as $$F \times (Cr_F - 0.16) \times A_C/A_{Cr} \times 6/Cr_a$$

wherein
- F = measured ferrite content of the weld, volume percent;
- $Cr_F$ = fractional chromium content of ferrite in the absence of carbon and nitrogen (generally about 0.25);
- $Cr_a$ = number of chromium atoms in the molecular formula of the $M_{23}(C,N)_6$ precipitant (generally about 16);
- $A_C$ = the atomic weight of carbon or weighted atomic weight of nitrogen plus carbon;
- $A_{Cr}$ = atomic weight of chromium; and
- 6 = the number of carbons or carbon plus nitrogen in the molecular formula of $M_{23}(C,N)_6$.

For example, if $Cr_F = 0.25$, $Cr_a = 16$ and $A_C = 12$, the minimum amount of carbon plus nitrogen required will be a weight percent about 0.0078 times the volume percent ferrite present in the weldment. The $Cr_F$, $Cr_a$ and $A_C$ values can be determined for a particular alloy system by standard methods of analysis.

The process of sigma suppression according to this invention is rate controlled in that sufficient chromium must diffuse from the ferrite phase toward the grain boundary and combine with carbon or with carbon and nitrogen before a significant amount of sigma phase is formed. The diffusion process will be more rapid when ferrite is present in a finely divided form or as long narrow strips as opposed to large patches. It is known that in welding operations, high cooling rates such as those produced by high rates of travel and lower heat inputs generally produce more finely divided ferrite. In general, in order to provide sufficient carbon plus nitrogen, one should multiply the carbon plus nitrogen percent obtained from the above formula by about 2 to provide an appropriate safety margin. Since $Cr_F$, $Cr_a$ and $A_C$ are fairly constant for phases present in austenitic stainless steels, the carbon plus nitrogen content in weight percent should be 0.015-0.030 times the volume percent ferrite present in the weld deposit in order to substantially prevent the transformation of ferrite to sigma phase upon exposure to elevated temperatures. By "substantially prevent" it is meant that less than about 10% of the ferrite present would be transformed to sigma phase upon aging at 400°–900° C. for 10,000 hours. If carbon plus nitrogen is present in a weight percent greater than about 0.030 times the volume percent of ferrite within the alloy, embrittlement can occur. The preferred quantity of carbon plus nitrogen is about 0.020 times the volume percent of ferrite in the alloy. The volume percent is approximately equal to the weight percent of ferrite in the alloy, and either percentage can be used for calculation purposes.

It is known in the welding art that the amount of carbon and nitrogen present in a weld deposit depends upon many parameters, such as the content of the base metal and the welding rod or electrode, as well as other conditions such as the impurities present within the cover gas used. If the cover gas, typically argon, contains nitrogen, the nitrogen content of the weld deposit will be higher than that of the filler metal, i.e., the welding rod or electrode. If the cover gas contains oxygen, carbon present in the welding rod or electrode will be volatilized and the carbon content of the weld deposit will be lower than that of the welding rod or electrode. The argon cover gas typically used in arc-welding, typically contains some oxygen impurities. Oxygen and nitrogen can also enter a weld from the surrounding air when insufficient cover gas is used. Consequently, even when welding electrodes or rods having large amounts of carbon are used, the weld deposit may not contain sufficient carbon plus nitrogen to prevent sigma phase formation upon aging. It is expected that a limited amount of routine trial and error testing will be required, to determine the composition of the cover gas to provide the desired carbon plus nitrogen content of the weld deposit for a particular welding rod or electrode composition, and such experimentation is well within the skill of the art. It is also contemplated that the amount of carbon or carbon and nitrogen necessary to prevent sigma phase formation can be achieved in the weld deposit by using appropriate welding fluxes, such as those containing carbides. Based upon the teachings herein, workers in the art can readily determine the proper composition of welding alloys and atmospheres for a particular base metal to result in the formation of weld deposits having carbon plus nitrogen compositions specified herein. The ferrite composition of the weld deposit can be estimated from the FIGURE and can be measured after deposition in the customary manner.

The supression of the transformation of ferrite to sigma phase according to this invention is useful in joining any austenitic stainless steel components by ferrite-containing austenitic stainless steel weld deposits. Of particular interest is a modification of weldments made with 16-8-2 filler metal, having the nominal composition of 16 wt.% Cr, 8 wt.% Ni, 2 wt.% Mo, and the balance predominantly iron. 16-8-2 weld filler metal typically also contains minor amounts of other elements, for example less than 0.3 wt.% Si which is a preferred upper limit, 1.0 to 1.5 wt.% Mn and less than 0.01 wt.% S. It has been found according to this invention that the formation of chi phase can be prevented in such alloys by the control of the Mo composition below about 1.2 wt.%. Accordingly, this invention comprises a composite structure having at least two structural portions of austenitic stainless steel joined together by a ferrite-containing austenitic stainless steel weldment. The weldment has a composition comprising in weight percent 8.5–9.5% Ni, 14.0–16.4% Cr, up to 1.2% Mo (preferably 0.5–1.2% Mo) and the balance predominantly iron. The carbon plus nitrogen present in said weldment in a weight percent at least 0.015–0.030 times the volume percent of ferrite and sufficient to substantially prevent the transformation of ferrite phase to sigma phase upon exposure to elevated temperatures. The molybdenum content of said weldment is 0–1.2 wt.% and insufficient to result in the formation of chi phase upon exposure to elevated temperature, i.e., 500°–900° C. for 10,000 hours. The weldment typically can contain up to 0.3% Si, up to 0.01% S and 1.0 to 1.5% Mn. Nb can be present up to about 100 ppm for enhanced strength. The weld deposit can consist essentially of in weight percent 8.5–9.5% Ni, 14.0–16.4% Cr, up to 1.2% Mo, and the balance iron. By "consisting essentially of" it is meant excluding other elements in amounts sufficient to materially affect the crack-resistance of the weldment upon aging. The weld deposit of this invention, resistant to chi phase and sigma phase formation, is particularly useful for joining austenitic stainless steel members having the nominal composition by weight percent 8–15% Ni, 14–18% Cr, 0–2% Mo and predominantly Fe as the balance. The stainless steel members can contain minor amounts of other elements such as Ti present in type 321 stainless steel and Nb present in type 347 stainless steel, or the balance can be essentially all iron.

EXAMPLE 1

Materials from two commercial type 16-8-2 weld filler metal heats were melted by manually casting weld wires from each of the heats into several cylindrical buttons to avoid contamination from base metal. The composition of the weld wires is shown in Table 1. A gas tungsten arc torch was used and the wire was melted into a copper mold. Specimens cut from these buttons were encapsulated in vacuum in Inconel cans by electron beam welding and aged in air furnaces at one of several temperatures and times, as reported in Table 2. After aging, samples were examined by a number of techniques including optical metallography, transmission electron microscopy, and scanning transmission electron microscopy with accompanying analytical X-ray spectroscopy, electrolytic extraction and X-ray examination of the extracted precipitate material.

TABLE 1

| Element | Content, wt %, in Each Heat | |
|---|---|---|
| | 2367R | D1309T |
| N | 0.0475 | 0.0394 |
| C | 0.040[a] | 0.073[a] |
| Mn | 1.19 | 1.44 |
| Si | 0.33 | 0.42 |
| S | 0.013 | 0.011 |
| P | 0.026 | 0.019 |
| Cr | 16.36 | 15.16 |
| Ni | 8.72 | 8.42 |
| Mo | 1.64 | 1.28 |
| Al | | 0.20 |

[a]Analyzed value, differed slightly from vendor analysis.

Heat 2367R has a higher molybdenum content a slightly higher chromium content but less carbon plus nitrogen. Table 2 sets forth the amount and type of precipitate which was found in the sample. Ferrite was dissolved during the electrolytic extraction process and is reported only for the as-cast material, where a piece was apparently separated before dissolution was complete.

It is seen from Table 2 that chi phase formation is related to the molybdenum content. No chi phase was found in heat D1309T but heat 2367R contained significant amounts of chi. By maintaining the molybdenum content below about 1.2% in the weld deposit, chi phase formation upon aging can be avoided. Of course, if the base metal is high in Mo, diffusion can result in a higher Mo content in the weld deposit. In such cases, a lower Mo content of the filler metal is required.

TABLE 2

| Specimen Sample | Aging Conditions | | Precipitate | | X-Ray Results | | |
|---|---|---|---|---|---|---|---|
| | Temperature (°C.) | Time (hr) | Content (wt %) | Phase | Spacing | Value (nm) | Intensity Line |
| Heat D1309T | | | | | | | |
| As-cast | | | 0.153 | Ferrite | $a_0$ | 0.2882 | |
| | | | | Unknown[a] | d | 0.2186 | |
| DE-26 | 649 | 500 | 0.787 | $M_{23}C_6$ | $a_0$ | 1.0664 | |
| DE-28 | 649 | 1,000 | 0.813 | $M_{23}C_6$ | $a_0$ | 1.0657 | |

TABLE 2 -continued

| Specimen Sample | Aging Conditions | | Precipitate Content (wt %) | Phase | X-Ray Results | | |
|---|---|---|---|---|---|---|---|
| | Temperature (°C.) | Time (hr) | | | Spacing | Value (nm) | Intensity Line |
| | | | | Unknown[a] | d | 0.2669 | |
| DE-29 | 649 | 5,000 | 1.046 | $M_{23}C_{(330)}$ | $a_o$ | 1.0655 | |
| DE-30 | 732 | 500 | 0.997 | $M_{23}C_6$ | $a_o$ | 1.0675 | |
| | | | | Unknown[a] | d | 0.2448 | |
| DE-31 | 732 | 1,000 | 1.081 | $M_{23}C_6$ | $a_o$ | 1.0675 | |
| DE-32 | 732 | 10,000 | 1.913 | $M_{23}C_6$ | $a_o$ | 1.0679 | |
| Heat 2367R | | | | | | | |
| DE-10 | 649 | 500 | 0.92 | | | | |
| DE-11 | 649 | 1,000 | 1.0 | | | | |
| DE-12 | 649 | 5,000 | 1.31 | $M_{23}C_6$ | $a_o$ | 1.0678 | (333) 73 |
| | | | | Chi | $a_o$ | 0.8879 | (330) 5 |
| DE-15 | 732 | 1,000 | 1.22 | $M_{23}C_6$ | $a_o$ | 1.0692 | (333) 110 |
| | | | | Chi | $a_o$ | 0.8862 | (330) 25 |
| DE-16 | 732 | 10,000 | 2.63 | $M_{23}C_6$ | $a_o$ | 1.0715 | (333) 50 |
| | | | | Chi | $a_o$ | 0.8901 | (330) 124 |

[a] probably a poorly crystallized slag inclusion

No sigma phase was found in either alloy after aging, even as shown in Table 2 after aging 10,000 hours at a temperature in excess of 700° C. A transmission electron micrograph of a specimen from D1309T showed two delta ferrite regions that were present in an as-cast specimen. Very early in the aging cycle, actually during the cooling of the original sample, carbides formed around the delta ferrite. Elemental analyses were performed using an energy dispersive X-ray detector interfaced to the electron microscope, and this data is shown for areas designated A-G in Table 3. Ferrite (area D) having no $M_{23}C_6$ around it had a high Cr/Fe intensity ratio relative to the matrix metal. On the other hand ferrite (area A) surrounded by $M_{23}C_6$ precipitate had a significantly lower Cr/Fe ratio, only slightly higher than that of the matrix itself. The $M_{23}C_6$ phase surrounding the ferrite had a quite high Cr/Fe ratio, indicating that carbide formation at the austenite/ferrite interface reduced the Cr concentration in the ferrite phase. It is shown that when the carbon or carbon plus nitrogen content within the weld deposit is sufficient, ferrite need not transform to sigma phase upon aging. By control of the molybdenum concentration, chi phase formation is prevented.

TABLE 3

| Region | Intensity Ratio (Approx. Atom Ratio) | | | |
|---|---|---|---|---|
| | Cr/Fe | Ni/Fe | Mo/Fe | Si/Fe |
| Ferrite A | 0.232 | 0.034 | 0.015 | 0.016 |
| $M_{23}C_6$ at B | 0.551 | 0.075 | 0.035 | 0.010 |
| Matrix near ferrite at C | 0.248 | 0.10 | 0.010 | 0.019 |
| Ferrite 2, center at D | 0.322 | 0.045 | 0.017 | 0.012 |
| Ferrite 2, edge at E | 0.305 | 0.049 | 0.018 | 0.019 |
| Matrix near ferrite 2, at F | 0.209 | 0.10 | 0.008 | 0.012 |
| Matrix further from ferrite 2, at G | 0.213 | 0.11 | 0.006 | 0.009 |
| Bulk composition | 0.223 | 0.11 | 0.010 | 0.011 |

All that is necessary for the practice of this invention is that the composition of the weld deposit be controlled as described herein, e.g., by controlling the filler metal and cover gas compositions. The weld deposit is useful for joining any austenitic stainless steel alloy. The weld deposit can be formed by any of the well-known techniques of welding such as shielded metal arc welding, gas tungsten arc welding, gas metal arc welding or submerged arc welding. The resulting welded article is a composite structure comprising these two structural portions of stainless steel joined to one another by an austenitic stainless steel weldment containing ferrite phase which does not transform to sigma phase upon aging. Those skilled in the art are capable of controlling the carbon or the carbon plus nitrogen ratio with respect to the ferrite ratio as described herein. For example, the amount of ferrite formed during a particular welding process can be determined as described hereinbefore by the use of a Magna-Gage and the amount of carbon measured by chemical analysis of sample welds. The weld metal composition, the $N_2$ or $O_2$ composition of the welding cover gas or the composition of fluxes can be varied to increase the amount of carbon plus nitrogen present in the weld deposit. Likewise, the molybdenum content can also be controlled below the levels at which chi phase forms by controlling the molybdenum content of the filler metal.

What is claimed is:

1. A composite structure comprising at least two structural portions of austenitic stainless steel joined together by a weldment of austenitic stainless steel containing a ferrite phase, said weldment consisting essentially of by weight 8.5 to 9.5% Ni, 14.0 to 16.4% Cr, up to 1.2% Mo, an effective concentration of carbon plus nitrogen, and the balance predominantly Fe, said effective concentration of carbon plus nitrogen being sufficient to inhibit the transformation of ferrite phase to sigma phase upon prolonged exposure of the structure to elevated temperatures.

2. The composite structure as claimed in claim 1 wherein the effective concentration of carbon plus nitrogen is in a range of 0.015 to 0.030 weight percent times the volume percent of the ferrite phase in the weldment.

3. The composite claimed in claim 1, wherein said prolonged exposure to elevated temperatures is at a temperature in excess of 700° C. for at least 10,000 hours.

4. The composite claimed in claim 1, wherein the austenitic stainless steel structural portions joined together by said weldment comprise by weight 8 to 15% Ni, 14 to 18% Cr, up to 2% Mo, and the balance predominantly Fe.

* * * * *